United States Patent [19]
Berg

[11] Patent Number: 4,553,386
[45] Date of Patent: Nov. 19, 1985

[54] COMBUSTION CHAMBER FOR DUAL TURBINE WHEEL ENGINE

[76] Inventor: Martin Berg, 1544 Ames St., Lakewood, Colo. 80214

[21] Appl. No.: 601,305

[22] Filed: Apr. 17, 1984

Related U.S. Application Data

[63] Continuation-in-part of Ser. No. 345,612, Feb. 4, 1982, abandoned.

[51] Int. Cl.[4] .............................................. F02C 6/00
[52] U.S. Cl. .................................. 60/39.15; 60/39.37
[58] Field of Search ................ 60/39.15, 39.37, 39.75, 60/726, 731, 740, 746, 749, 751, 752, 760; 415/93, 95, 101, 103, 143, 199.4, 199.5, 202, 216, 217, 218

[56] References Cited

U.S. PATENT DOCUMENTS

| | | | |
|---|---|---|---|
| 1,640,784 | 8/1927 | Lorenzen | 60/726 |
| 1,793,640 | 2/1931 | Schilling | 60/746 |
| 2,721,445 | 10/1955 | Giliberty | 60/726 |
| 2,784,552 | 3/1957 | Vickland | 60/39.75 |
| 2,967,394 | 1/1961 | Jensen | 60/749 |
| 3,088,279 | 5/1963 | Diedrich | 60/751 |
| 3,398,527 | 8/1968 | Taylor et al. | 60/752 |
| 3,818,695 | 6/1974 | Rylewski | 60/726 |
| 3,831,854 | 8/1974 | Sato et al. | 60/760 |
| 3,939,653 | 2/1976 | Schirmer | 60/752 |
| 3,978,658 | 9/1976 | Forbes et al. | 60/39.37 |

FOREIGN PATENT DOCUMENTS

| | | | |
|---|---|---|---|
| 2121738 | 11/1972 | Fed. Rep. of Germany | 60/726 |
| 1275970 | 6/1972 | United Kingdom | 415/199.5 |

*Primary Examiner*—Louis J. Casaregola
*Assistant Examiner*—Donald E. Stout
*Attorney, Agent, or Firm*—Fields, Lewis, Pittenger & Rost

[57] ABSTRACT

A turbine engine for powering aircraft, land vehicles and the like having a stationary member inclusive of casing portions defining a plurality of radially extending, spaced combustion chambers. A rotary member within the stationary member has two or more axially spaced turbine wheels mounted on a rotary shaft with the turbine wheels within the casing portions and arranged with turbine blades that receive exhaust gases from the chamber directed through vanes at a particular angle to enhance the thrust on the two turbine wheels. An impeller on the rotary shaft draws air along the axis of the shaft, out in a radial direction around the chambers, through minute openings in a manifold section, and back in a radial direction to disburse the air into the combustion chambers for burning of a fuel-air mixture therein to produce the exhaust gases. In one embodiment the air is introduced into the combustion chambers at right angles to the exhaust ducts and in another the exhaust ducts are arranged directly opposite each air-fuel nozzle and extend approximately 90° from each other so as to direct the continuous stream of combustion gases directly to the respective turbine wheels.

20 Claims, 20 Drawing Figures

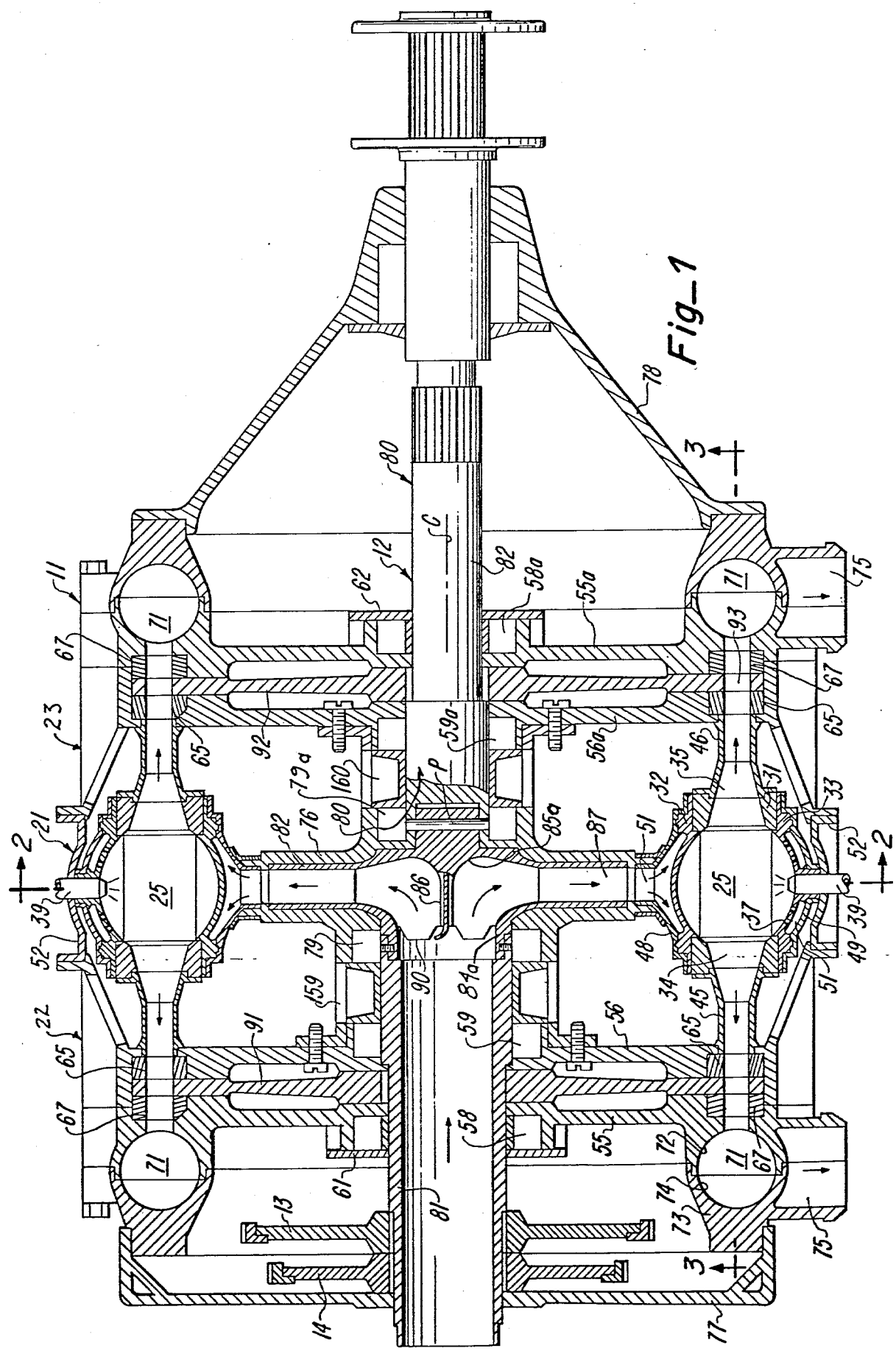

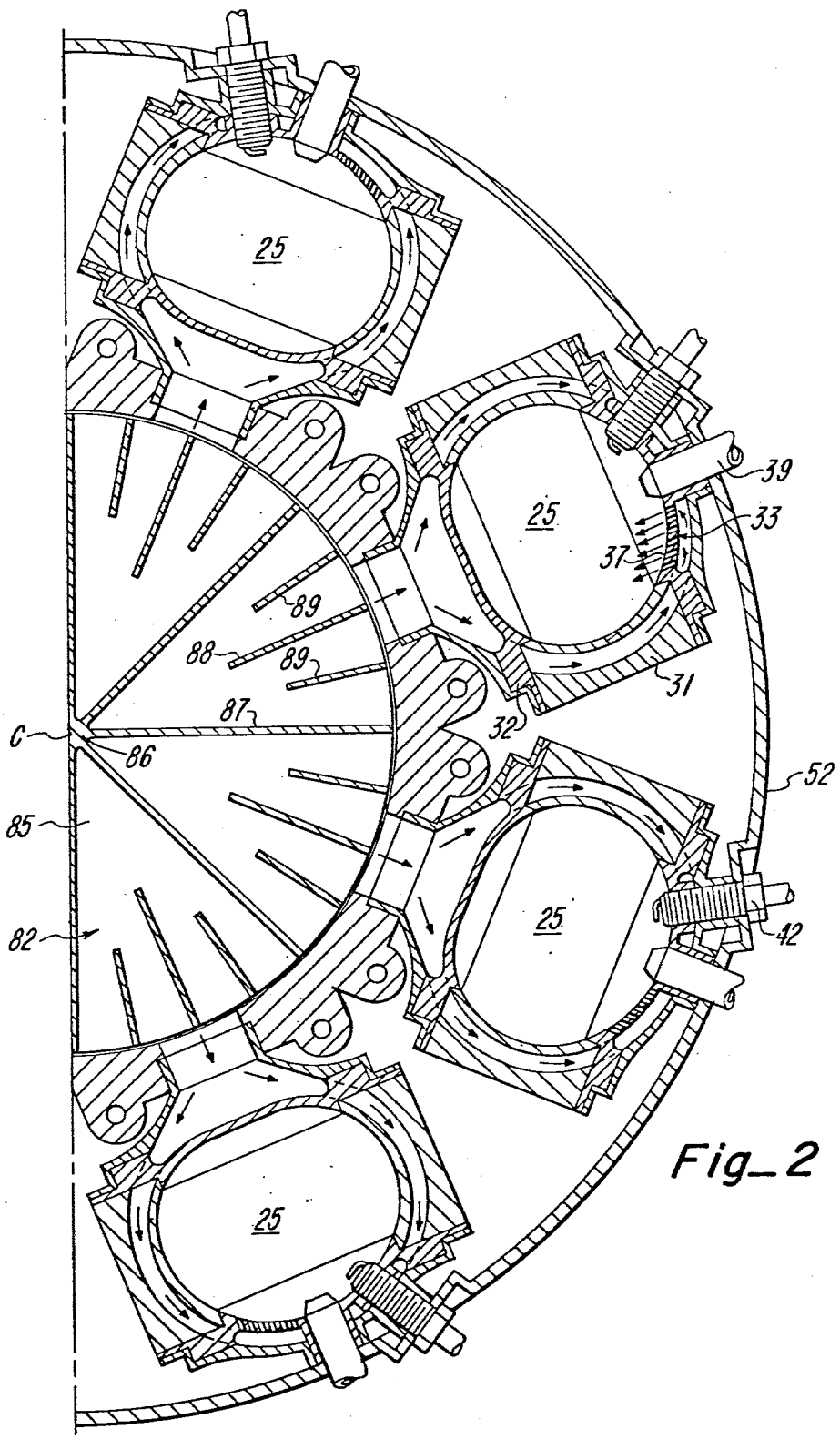
Fig_2

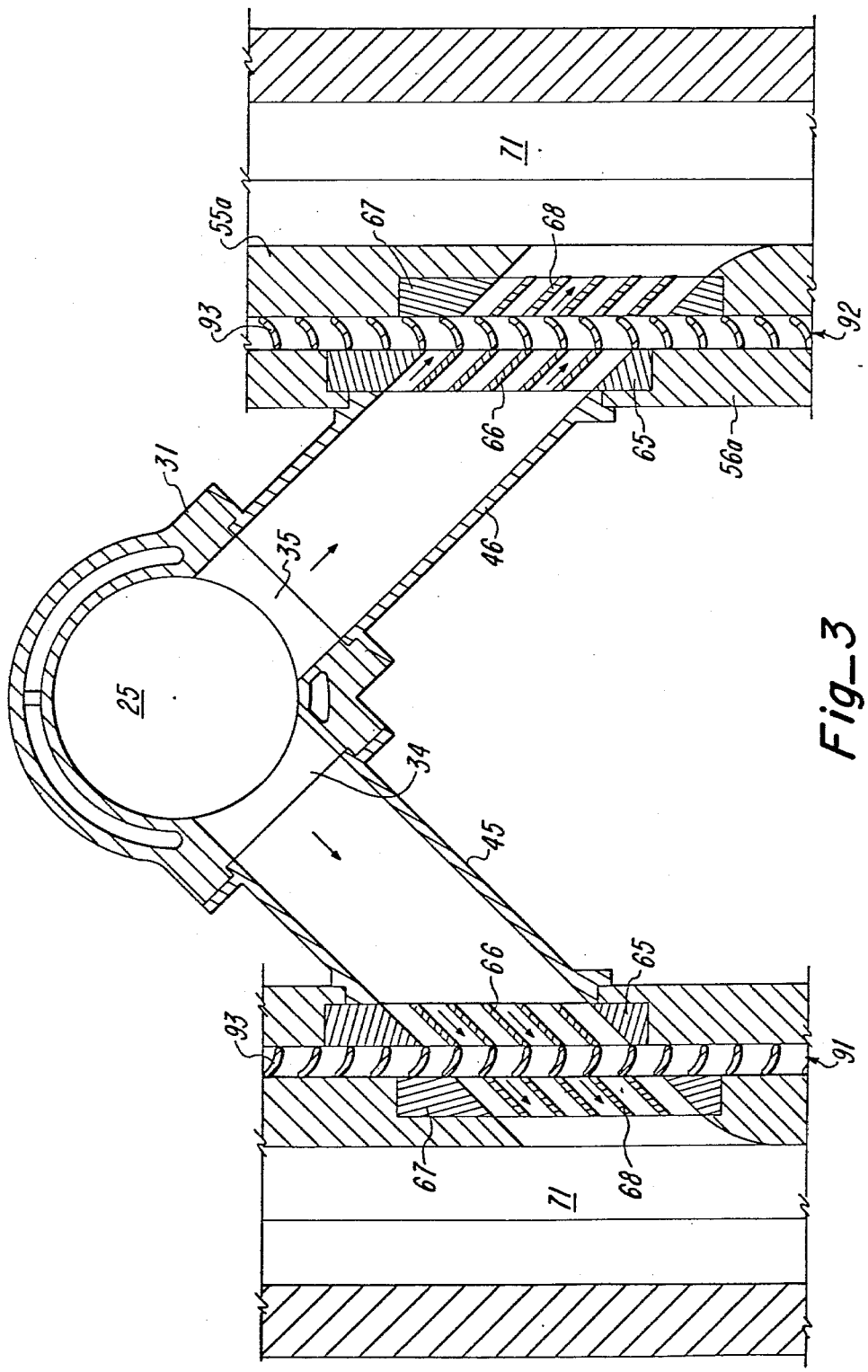
Fig_3

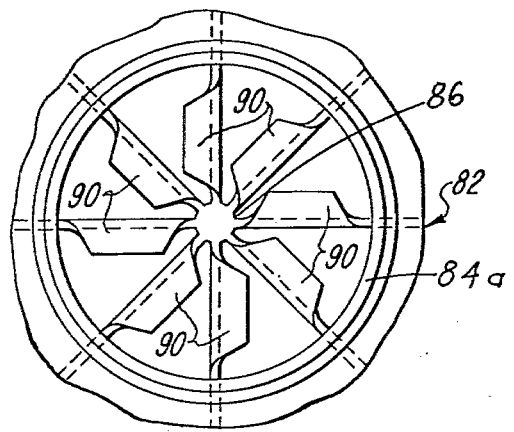
Fig_4
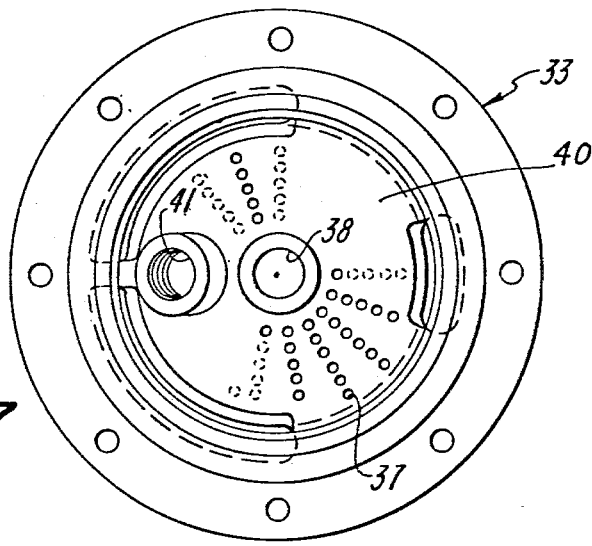
Fig_7
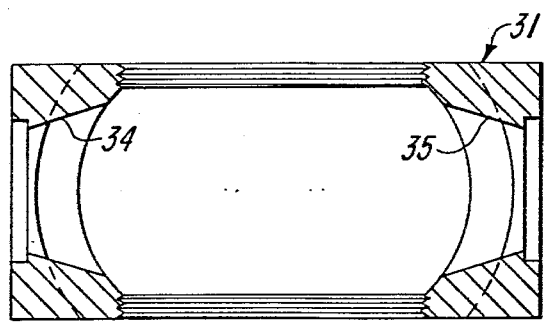
Fig_5
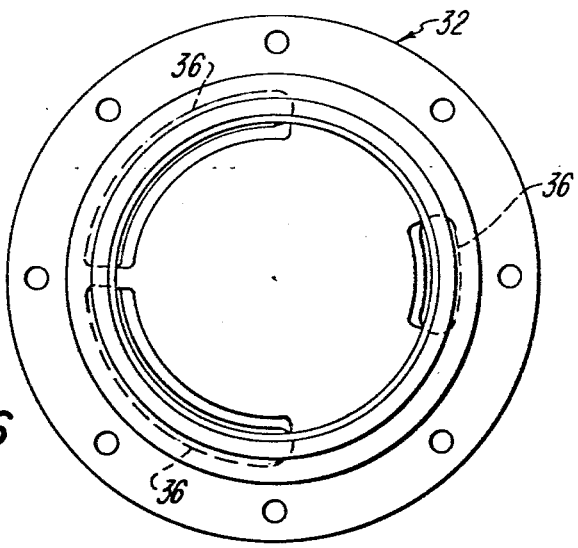
Fig_6

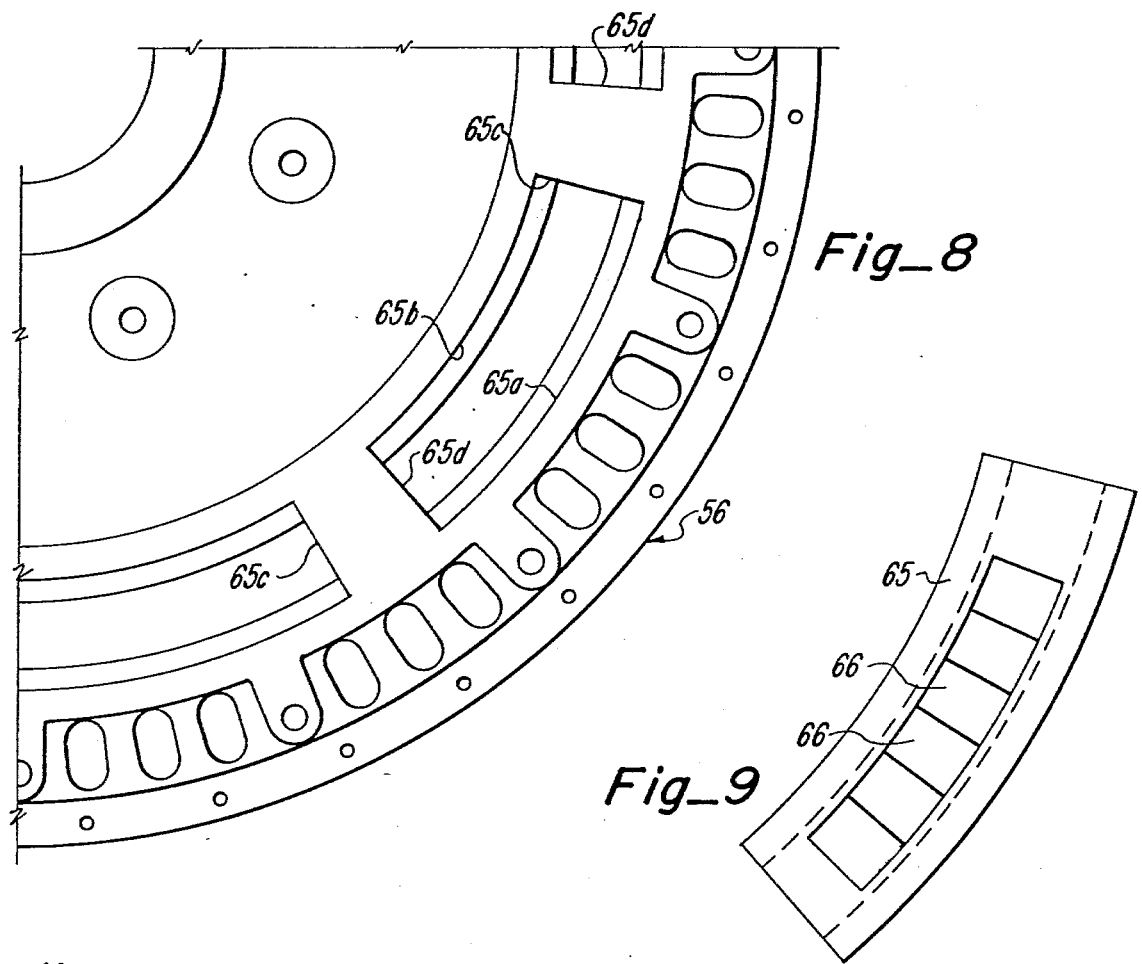
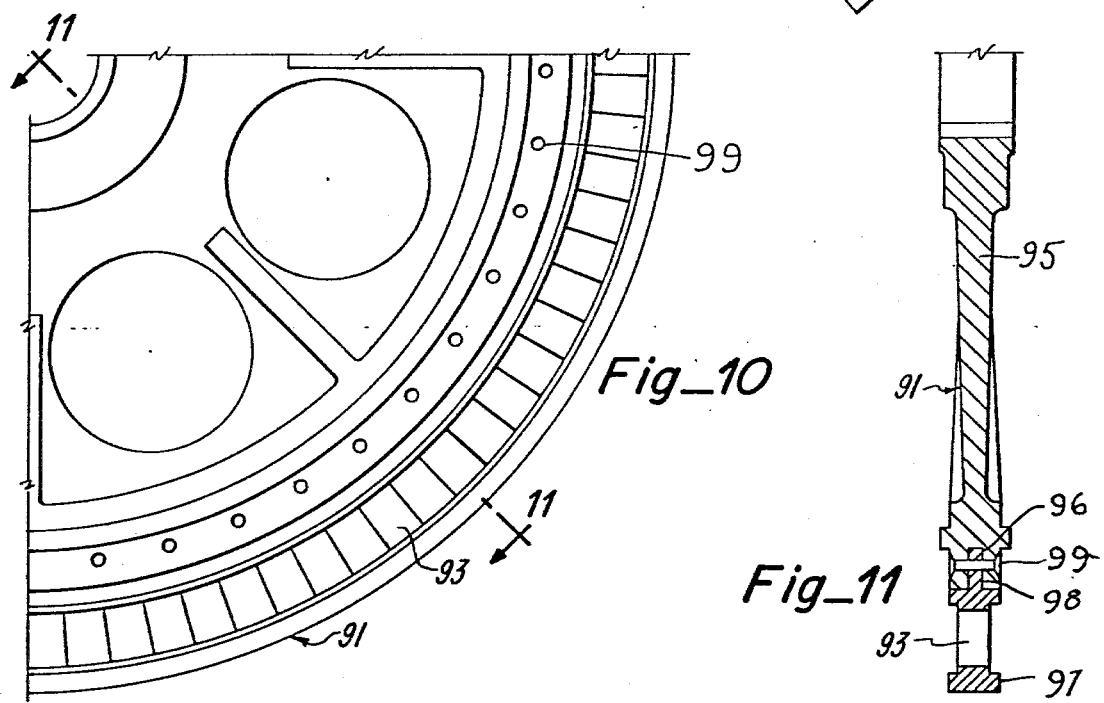

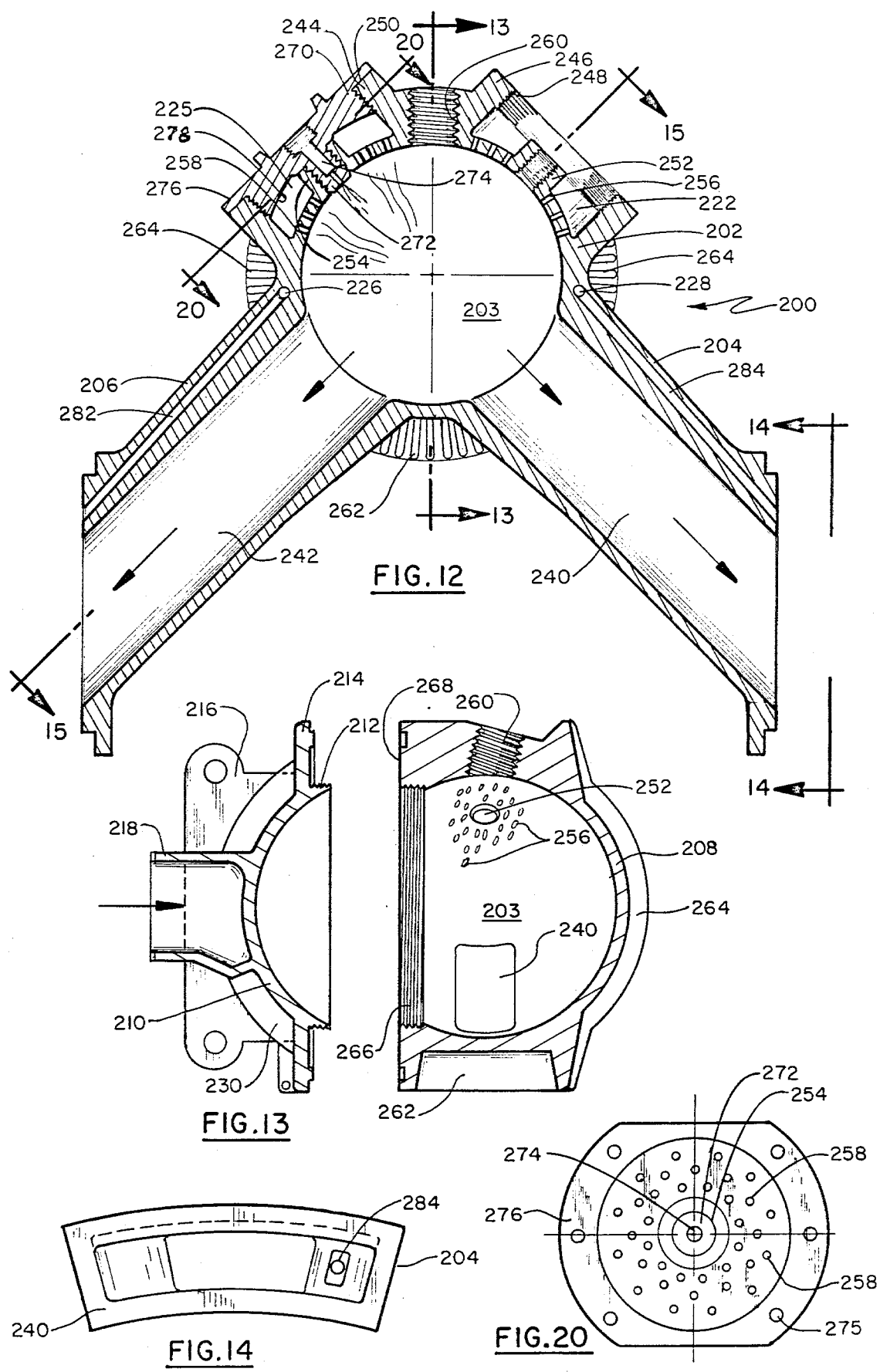

COMBUSTION CHAMBER FOR DUAL TURBINE WHEEL ENGINE

This application is a continuation-in-part of my co-pending U.S. Pat. application Ser. No. 345,612, filed Feb. 4, 1982, now abandoned.

TECHNICAL FIELD

This invention relates to a novel and improved engine of the internal combustion type having dual or spaced turbine wheels and improved combustion chamber.

BACKGROUND ART

In the turbine art the practice is to produce a gas under pressure that is moved against the blades of a turbine wheel to produce mechanical rotary motion. Some prior known engines of this type ignite an airfuel mixture to drive a turbine wheel. U.S. Pat. No. 972,624 is an example of an early approach to this type of engine. The use of two axially-spaced turbine wheels is illustrated in U.S. Pat. No. 1,348,103 wherein, as the rotor revolves, the vanes suck an explosive charge through a shaft into an explosive mixture compression chamber and then into a combustion chamber using radial vanes and relatively complex valving. The engine of the present invention does not require preliminary compression of the air in a compression chamber and provides a number of improvements and advantages over the above-noted prior art, as will be apparent from a reading of the following detailed description.

DISCLOSURE OF INVENTION

A dual or spaced turbine wheel engine disclosed includes an outer casing having a central casing portion with a plurality of radially arranged and circumferentially spaced combustion chambers with oppositely directed, axially extending outlet ducts, each having inclined vanes, together with two additional casing portions on opposite ends of the central portion surrounding a pair of axially spaced turbine wheels. Each turbine wheel has inclined peripheral blades disposed at substantially right angles to said vanes. The turbine wheels are mounted for rotation with a rotary shaft on which an impeller is mounted that pumps air, first in an axial direction through a hollow intake portion of the shaft, and then radially out from the shaft, and finally, radially inwardly and via a substantially semispherical manifold having minute openings to disperse the air into the combustion chambers where the air is mixed with fuel in a spray form and ignited by an igniter member which causes the gas to expand producing a thrust against the turbine wheel blades that is exerted simultaneously in opposite axial directions to nullify the exhaust thrust. The rotating dual turbine wheels causes the interconnecting shaft to rotate producing a considerable amount of shaft power.

BRIEF DESCRIPTION OF DRAWINGS

The details of this invention will be described in connection with the accompanying drawings, in which:

FIG. 1 is a vertical sectional view of a dual turbine wheel engine embodying features of the present invention;

FIG. 2 is a sectional view taken along lines 2—2 of FIG. 1 showing a half segment with the other half being identical;

FIG. 3 is a sectional view taken along lines 3—3 of FIG. 1;

FIG. 4 is a fragmentary front elevation view of the central portion of the impeller;

FIG. 5 is a sectional view through the center along center lines of the discharge ducts of an intermediate plate forming the combustion chamber, as seen in FIG. 3;

FIG. 6 is a bottom plan view of the bottom plate;

FIG. 7 is a top plan view of the top plate;

FIG. 8 is an end elevation of the outer cover case with the vane blocks removed;

FIG. 9 is a side elevation view of one of the vane blocks;

FIG. 10 is an end elevation view of a 90° segment of one turbine wheel;

FIG. 11 is a sectional view taken along the lines 11—11 of FIG. 10;

FIG. 12 is a horizontal sectional view of another embodiment of the combustion chamber according to the present invention;

FIG. 13 is a sectional view taken along the lines 13—13 of FIG. 12 showing an exploded view of the combustion chamber;

FIG. 14 is a sectional view taken along lines 14—14 of FIG. 12;

FIG. 20 is a side elevation view taken along the lines 20—20 of FIG. 12.

DETAILED DESCRIPTION

Figure 15:
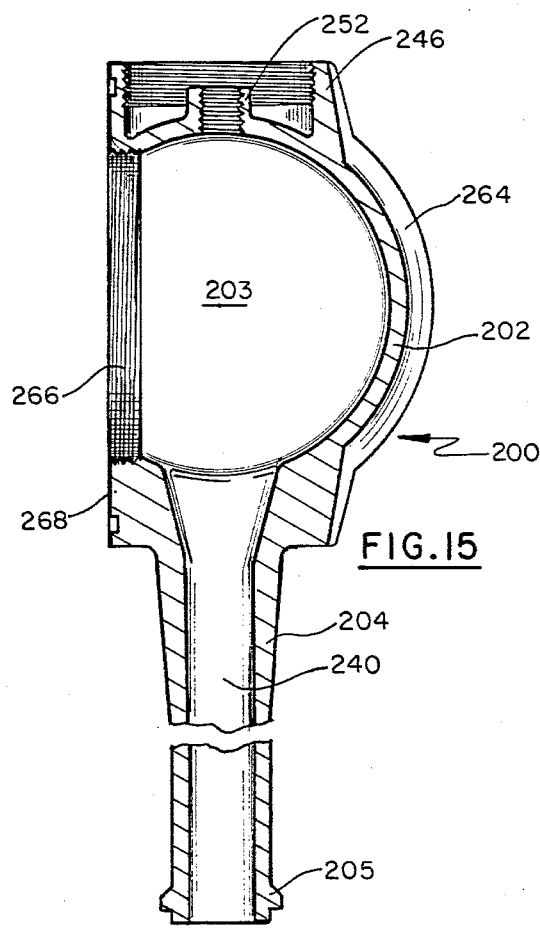
FIG. 15 is a sectional view taken along lines 15—15 of FIG. 12.
Figure 16:
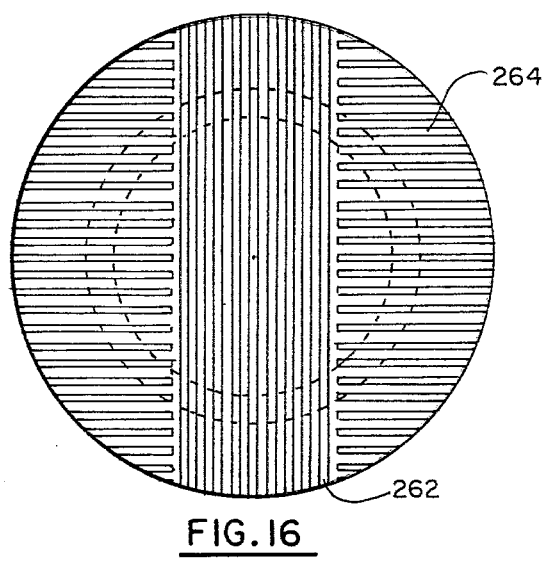
FIG. 16 is a top plan view showing the outside of the combustion chamber.

Refering now to the drawings, the engine shown is arranged for powering an aircraft, automobile, or other vehicle and, broadly stated, has a stationary member 11 and a rotary member 12. The rotary member 12 has a construction shown at the output end thereof adapted to have mounted a propeller or connected to a transmission or other drive shaft. A starter gear 13 and an electric generator gear 14 are mounted on the input end of the rotary member 12 and an air filter can be mounted over the input end adjacent gear 14.

The stationary member 11 shown includes a central casing portion 21 and two additional casing portions 22 and 23 of a construction similar to one another and herein also referred to as input casing portion 22 and output casing portion 23, located on opposite ends of the central casing portion 21. The central casing portion 21 shown has eight radially arranged and circumferentially spaced combustion chambers 25 arranged about and spaced from the central axis of the engine, designated C. The combustion chambers are disposed at equally spaced intervals around the central axis C.

Each combustion chamber 25 is defined by an assembly which includes an intermediate plate 31, a bottom plate 32 closest to the central axis C, and a top plate 33 disposed radially out from the bottom plate a further distance from central axis C than bottom plate 32. Intermediate plate 31 has two axially extending outlets 34 and 35 at opposite ends. Bottom plate 32 has three circumferentially spaced, arcuate air inlet openings 36.

Top plate 33 has a semispherically shaped manifold section 40 with a plurality of minute air inlet openings 37 substantially uniformly distributed over the entire surface area thereof to uniformly distribute air into the combustion chamber 25. Top plate 33 further has a central top opening 38 in which a fuel nozzle 39 is mounted for introducing a spray of fuel into the associated combustion chamber 25, and an offset aperture 41 in which there is mounted an igniter member 42 for igniting an air-fuel mixture in the associated combustion chamber.

Each combustion chamber 25 is further provided with two exhaust ducts 45 and 46 that extend axially out and at an angle from the opposite ends of an associated combustion chamber beyond outlets 34 and 35, respectively.

A jacket around each combustion chamber 25 is provided by a bottom intake plate 48 which, together with bottom plate 32, forms an air flow passage 51 leading from the peripheral air outlet of the impeller described hereinafter, and a top head plate 49 via openings 36 which, together with top plate 33, forms a portion of an air flow passage 51 that directs the air into and through the minute openings or apertures 37 in the manifold section 40. An outer annulus or belt 52 extends entirely around the top head plate 49.

In this combustion chamber arrangement, the air leaving the impeller 86 passes outwardly through the air flow passages 51 which surround the intermediate plate 31 of the combustion chamber 25 providing cooling for the interior walls of the combustion chamber 25. At the same time, this cooling effect also preheats the air prior to being introduced into the combustion process. The apertures 37 provided in the top plate 33 are arranged in concentric, circular patterns generally around the fuel nozzle 39. The position and angular direction of these holes is provided to direct the air stream to a focal point within the chamber 25 in a swirling or spiral pattern to provide turbulence and a mixing effect with the incoming fuel spray.

Through this arrangement, the fuel droplets are thoroughly atomized and mixed to substantially increase the combustion efficiency of the mixture. This mixture in turn impacts against the opposite wall of the combustion chamber, namely, the internal surface of the bottom plate 32 causing further distribution with the flame pattern splitting so as to be divided equally to exhaust through the outlets 34 and 35 on opposite sides. Thus, the flame front is caused to be split and turned 90° from the axis of the incoming mixture causing the flame to be substantially retained without the possibility of flameout.

Each of the casing portions 22 and 23 is of a similar construction and will be described with specific reference to casing portion 22. Casing portion 22 shown is comprised of oppositely disposed outer and inner cover plates 55 and 56, respectively, which mount on ball bearings 58 and 59, respectively, permitting shaft 80 to rotate relative to cover plates 55 and 56 while at the same time supporting same. The pair of outer and inner cover plates of casing portion 23 is designated by reference numerals 55a and 56a, respectively. End plates 61 and 62 hold the associated bearings and cover plates 55, 56, 55a and 56a against axial movement on shaft 80.

Each of inner cover plates 56 and 56a is provided with an insertable vane block 65 that spans a selected arc (35° shown in FIG. 9) having a plurality of spaced vanes 66 disposed at an angle to the opposed flat faces thereof forming airflow passages between vanes 66. As best seen in FIG. 8, the recessed area formed in the inner cover plate that is complimentary in shape to and receives a vane block 65 is defined by opposite arcuate surfaces 65a and 65b and end surfaces 65c and 65d. There are a total of eight recessed areas and eight insertable vane blocks in each inner cover plate. In turn, each of the outer cover plates 55 and 55a is provided with an insertable vane block 67 that spans the same arc and has the same number of spaced vanes 68 as vane block 65 above-described.

An annular exhaust chamber 71 is provided downstream of each vane block 67. These annular exhaust chambers 71 are formed by providing a hemispherical recess 72 in the outer face of the outer cover plate 55 and providing an exhaust case 73 that mounts on the cover plate and has a hemispherical recess formed therein on an inner face opposite recess 72, forming an annular cavity. Exhaust outlet 75 extends from each exhaust chamber either tangentially or opposite a plane through the engine shaft to discharge exhaust gasses from the engine. End covers 77 and 78 are shown mounted on the exhaust cases 73 to close the ends of outer cover plates 55 and 55a, respectively.

Impeller cover 66 is mounted on bearings 79 and 79a at the center of the engine. A blower fan 159 is mounted on the shaft 80 between cover plate 56 and impeller cover 76 and a blower fan 160 is mounted between the impeller cover 76 and the other inner cover plate 56a for cooling.

The rotary member 12 includes a shaft 80 having a hollow intake portion 81 with an air-moving impeller 82 on the inner end of portion 81 and an output portion 83 of the shaft extending beyond the impeller 82 in coaxial alignment with the intake portion 81. The intake portion 81 is shown as telescopically received in an end recess in the output portion 83 and is secured thereto by a locking pin P.

The impeller 82 is of the closed-faced type and has a circular-disc-shaped base portion 85 at the output side and a circular, disc-shaped front plate portion 84 opposite and spaced from the base portion 85 at the input side with a plurality of radially extending vanes 87 mounted between the plates to provide a plurality of radially outwardly diverging airflow passages inside the impeller. The base portion 85 has a dished or radius section 85a closest to the center so that the air is turned from an axial to a radial direction along a curved surface. A central hub 86 extends from the center of the base portion toward the input end of the impeller and has a turn at the front end.

The front plate portion 84 has a hollow hub portion 84a forming the axially extending airflow inlet into the impeller in full communication with the hollow intake portion 81 of the shaft. The passages through the impeller begin at the inlet in hub portion 84a and have an outlet at the outer peripheral end between each pair of radial vanes of the diverging passages.

The radial vanes 87 are disposed at 45° intervals and extend from the hub portion 84a to the periphery of the base portion and front plate portion. Additional vanes 88 are disposed midway between vanes 87 between the major vanes and extend from the periphery of the base and front plate portions a distance greater than half the distance to the central hub 86. Further vanes 89 are disposed midway between vanes 87 and 88 and extend from the periphery of the base and front plate portions a distance less than half the distance to the central hub portion.

Supplementary air input vanes 90 are mounted on hub 86 and extend radially out to further assist in drawing air into the impeller. The supplementary vanes in side elevation are trapezoidal in shape and extend from the hub 86 only part way into the inlet opening defined by hub portion 84a.

In the operation of the impeller 82, as indicated by the arrows, air is drawn in at the center inlet opening in hub portion 84a by the rotation of the impeller and action of vanes 90 and 87 and this air is given an acceleration by vanes 87 and emerges under pressure from the periphery of the impeller.

The rotary member 12 has one turbine wheel 91 affixed to the intake portion 81 of the rotary shaft and another turbine wheel 92 affixed to the output portion 83 of the shaft. The turbine wheels 91 and 92 being equal distant from the center of the engine. Each turbine wheel is generally disc-shaped and has a series of spaced turbine blades 93 on the periphery that are inclined to the flat side faces thereof at an angle of about 55° so as to be disposed at substantially right angles to the vanes 66 and 68 in the associated vane blocks 65 and 67 in the associated inner cover plates.

Each turbine blade 93 is of a generally concavo-convex shape with the convex face directed toward an associated discharge duct. In a preferred construction shown, each turbine wheel is made as an inner hub portion 95 with a groove 96 in the periphery and an outer ring portion 97 with a tongue portion 98 that fits in the grove, and the two are held together by rivets 99 or like fasteners.

In another embodiment of the combustion chamber, FIG. 12 shows a horizontal cross-section of a combustion chamber 200 having central body portion 202 and outwardly extending exhaust ducts or tubes 204 and 206.

The main combustion chamber portion 202 is composed of a spherical chamber having a main body portion 208 and a bottom cap portion 210. The bottom cap portion 210 has an external threaded area 212 and outwardly extending flange 214. A mounting flange 216 arranged perpendicular to the surface of flange 214 is used for mounting the combustion chamber in proper position on the engine. An air inlet passageway 218 is provided centrally positioned on the outer surface of the cap 210 and is suitably connected to the air outlet from the centrally located air compressor. The flange 214 has a number of equally spaced bolt holes 215 provided around its circumference for securely attaching the cap portion 210 to the main chamber portion 208.

Figure 17:
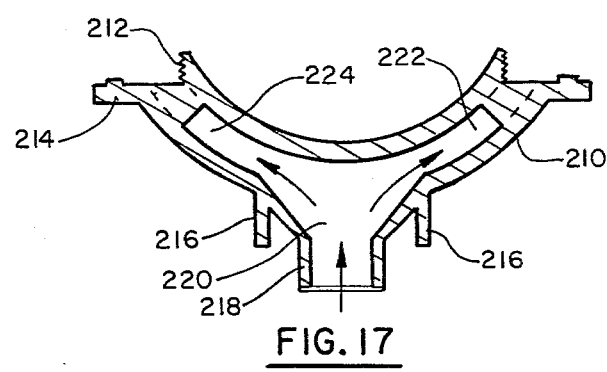
FIG. 17 is a side sectional view taken through the adapter portion shown on the left side of FIG. 13.
Figure 19:
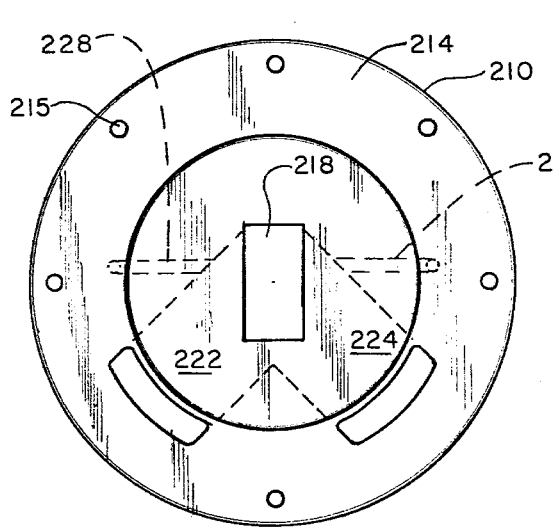
FIG. 19 is an inside view of the adapter portion shown in FIG. 17.
Figure 18:
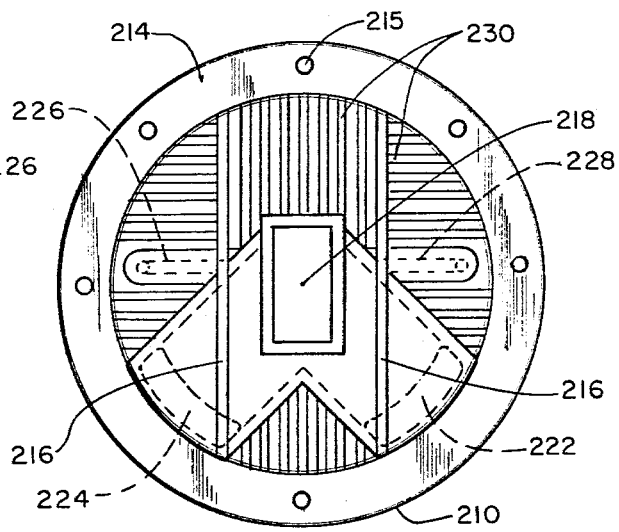
FIG. 18 is a bottom plan view of the adapter portion of the combustion chamber.

As shown in FIG. 17, incoming air passes through the inlet 218 into the internal passageway 220 where it splits into two separate legs 222 and 224. Two separate additional passageways 226, 228 also lead from the inlet 218. In this way, incoming pressurized air passing from the compressor through passageway 218 flows through passages 222, 224, 226 and 228. A plurality of cooling fins 230 are provided on the outside surface of the cap 210 to provide cooling for this portion.

The main chamber portion 208 includes the angularly extending exhaust ducts 204, 206 having internal passageways 240, 242, respectively. Threaded receptacles 244 and 246 are each positioned diagonally across the chamber 208 and directly aligned with the center line of the exhaust passageways 240, 242. The internal edge surfaces of the receptacles are threaded to receive a fuel nozzle cap 270 as will be described later. Centrally positioned within the receptacles 244, 246 are located internally threaded bosses 254, 252, respectively. A plurality of circularly positioned and equally spaced air nozzles 256, 258, are concentrically positioned around the bosses 252 and 254. As will be explained later, these holes are drilled at a predetermined angle to provide the desired airflow pattern for the combustion process.

A threaded aperture 260 is provided in the side of the chamber 208 equally distant between the recessed receptacles 244, 246. This threaded aperture is provided for the insertion of a suitable igniter for igniting the fuel-air mixture that is introduced into the interior cavity 203 of the combustion chamber 200. In addition, cooling fins 262 and 264 are provided around the outside surface of the chamber portion 208 in order to maintain the temperature within the chamber at a safe level. It should be added at this point that external cooling air can be provided over the outside surface of the engine for cooling purposes. This air is baffled and directed to pass over the central portion of the combustion chamber in order to obtain the desired cooling effect.

An interior threaded section 266 is provided in the body 208 which mates with the threaded portion 212 of the cap 210. Thus, the cap is screwed into the main portion of the combustion chamber 208 to join the parts together with a separate gasket or a ridge and groove seal provided between the flange 214 and the body surface 268 of the chamber 208. Once the cap is threadedly installed, retaining cap screws are inserted through the bolt holes 215 to secure the cap 210 to the chamber body. With the cap 210 securely installed, the interior cavity 203 of the chamber becomes a compeletely enclosed chamber for the retention of the combustion flame.

In order to provide the desired fuel-air mixture, a threaded fuel adapter 270 is installed in the receptacles 244, 246. For the sake of illustration, the adapter 270 is only shown in the left receptacle 244 as shown in FIG. 12. It is to be understood that an identical adapter is provided also in the receptacle 246. The adapter 270 includes a threaded fuel nozzle portion 272 which mates with the threaded boss 254. A threaded internal passageway 274 is provided for coupling to a high pressure source of fuel. A very fine series of holes is provided in the end of the fuel nozzle 272 for continously atomizing and spraying the fuel from the passageway 274 into the interior of the chamber 203. An outwardly extending flange 276 provided on the adapter 270 mates with and seals against the flat end surface 250 of the threaded receptacle boss 244. The inner surface 278 on the back side of the adapter 270 creates an annular cavity 225 which is an extension of the air passageway 224. Thus, the air passing upwardly through the inlet passageway 218 of the cap 210 communicates with the air cavity 225 so as to surround the threaded boss 254 containing the fuel nozzle 272. With the pressurized air present in the cavity 225, air passes through the nozzles 258 which causes the air to be introduced into the interior 203 of the combustion chamber 200.

The air holes or nozzles 258 can be formed by drilling through the wall of the chamber 202 and are positioned so as to direct the air flow to an apex point which is approximately at the center of the interior cavity 203 in the chamber. As an alternative, the holes can be angled slightly with respect to the center line of the nozzle 272 to provide a swirl or spiral pattern to the air as it is introduced into the chamber 202. The pressurized fuel is continuously sprayed into the air stream through the nozzle 272 to create a turbulence and mixing of the fuel with the air. At the same time the air pattern causes the combustion flame to be concentrated to provide a controlled core which passes outwardly through the exhaust passageways through the corresponding exhaust ducts.

As can be easily seen in FIG. 12, the flame patterns from the nozzles cross the interior of the combustion chamber near its center point. It is believed that this crossing of the flame patterns helps to retain the flame patterns within the chamber minimizing flame-outs which has been a problem in prior art combustion chambers. In addition, this crossing of the flame patterns not only provides a retention of the flame within the combustion chamber but produces a more uniform and complete mixing of the fuel-air mixtures with this expanded gas flowing through the exhaust passageways with controlled flow restriction creating a slight predetermined back pressure in the chamber.

The air passages 226 and 228 which extend from the cap 210 connect with internal exhaust duct passageways 282, 284, respectively. The air which passes through the passageways 282, 284 is provided to flow against the turbine blades to provide cooling for the blades to prevent overheating and premature failure.

As may be easily seen, this embodiment of a combustion chamber is provided for use with spaced turbine type engines as described herein. With this arrangement, equal and consistent exhaust gas flow is produced which impinges on the turbine blades creating a continuous application of turning force to the turbine blades. Thus, consistent and continuous power output through the turbine shaft is provided which is described and shown herein.

OPERATION

In the full sequence of operation for the above described engine, the rotary member 12 is initially turned by a conventional starter motor engaging the starter gear 13. Air is drawn by the rotation of the impeller 82 through the intake portion of the shaft and expelled radially out from the impeller 82, around the combustion chambers 25 and forced radially back into the combustion chambers via the manifold section 40, and is disbursed into the combustion chambers where it is mixed with the spray of fuel from the nozzles 39 and successively ignited by the igniter numbers 42. As the impeller rotates, there is a continuous flame generated which produces exhaust gases which are expelled under pressure axially out in opposite directions through the discharge ducts 45 and 46, through passages between vanes 66, and against the turbine blades 93 to simultaneously propel both turbine blades 91 and 92 in the same direction. The exhaust gases pass into the annular exhaust chambers 71 and discharge through outlet 75.

The modification for a land vehicle from that of the aircraft engine shown would be to have a modified form of cover plate 78 with a starter motor, fuel pump and generator mounted thereon along with suitable inlet air ducting, and gears 13 and 14 on the output side. The output portion of shaft 80 would extend through this modified form of cover plate.

Although the present invention has been described with a certain degree of particularity, it is understood that the present disclosure has been made by way of example and that changes and details of structure may be made without departing from the spirit thereof.

What is claimed is:

1. In a turbine engine, the combination comprising:
    a pair of spaced turbine wheels rotatable about the same axis on a common shaft;
    a Plurality of combustion chambers radially spaced about said axis between said turbine wheels, each said chamber having a hollow enclosed generally spherical body means having a center;
    at least a pair of substantially straight exhaust outlet tube means extending radially outwardly from opposite side portions of the wall of said body means from said center for conducting the exhaust gas flow from the combustion chamber in opposite directions to said turbine wheels, the free end of the tube means having coupling means for attaching the tube means to a casing for the turbine wheels to provide a closed passageway for the exhaust gases, said exhasut outlet tube means lying generally in a single plane;
    air inlet means connected to said body means, said inlet means being connected to a source of pressurized combustion air for said chamber,
    said body means having at least one fuel nozzle mounted in the wall of said body means extending radially inwardly toward said center and connected to a source of pressurized fuel, a plurality of apertures formed through a generally semispherically shaped manifold section of the wall of said body means in a substantially uniformly arranged pattern surrounding said fuel nozzle, the outside surface of the body means encompassing the apertures to form an enclosed cavity which is connected to said air inlet means whereby combustion air flows continously through the apertures into the combustion chamber to mix with the fuel being continuously injected into the chamber by the fuel nozzle means: and
    igniter means mounted through the wall of said body means and connected to a suitable source of energy for igniting the fuel-air mixture in the body means to provide a continuous flow of exhaust gases for driving the power turbine wheels simultaneously.

2. A combustion chamber as defined in claim 1 wherein said hollow spherical body means includes a main body portion and at least one cap portion forming a segment of the spherical body means, the height of said cap portion being less than the radius of said spherical body means, and said cap portion is removably attached to said main body portion by suitable fastening means.

3. A combustion chamber as defined in claim 2 wherein the cap means includes said combustion air inlet means.

4. A combustion chamber as defined in claim 1 wherein said combustion air inlet means includes passageways formed along the outside surface of the wall of said spherical body means whereby the air inlet means is connected to the cavity means associated with said air inlet apertures whereby the air inlet is preheated by the high combustion temperatures present within the combustion chamber.

5. A combustion chamber as defined in claim 1 wherein said fuel inlet nozzle is positioned at right angles to the plane of said exhaust outlet tube means with the fuel and air being introduced into said spherical body means impinging on the wall of said body means opposite to said fuel nozzle whereby the fuel-air mixture is thoroughly mixed prior to combustion and the exhaust gases are forced to split and turn 90° to pass outwardly through said exhaust outlet tube means.

6. A combustion chamber as defined in claim 1 wherein at least two fuel nozzles are provided in the walls of said spherical body means, each of said fuel nozzles being arranged diametrically opposite a respective exhaust outlet tube means whereby the exhaust gas flow patterns are generally coaxially with the center lines of the outlet tube means to provide a direct flow-path.

7. A combustion chamber as defined in claim 6 wherein said fuel nozzles are spaced circumferentially 90° from each other whereby the fuel-air mixture being introduced by each fuel and air nozzle means will cross to exit through the exhaust outlet tube means causing complete and thorough mixing of the exhaust gas streams in order to aid retention of the combustion flame pattern within the body means.

8. A combustion chamber as defined in claim 1 wherein the total cross-sectional area of the outlet tube means is reduced in size from the inlet to the outlet to maintain a desired back pressure within the body means to aid in retention of the combustion flame within the combustion chamber.

9. A combustion chamber as defined in claim 1 wherein each of said outlet tube means includes a separate elongated air passageway arranged parallel to the exhaust gas passageway, said second air passageway is connected to said air inlet means whereby cooling air is continuously bled through said outlet means to impinge upon and cool the respective turbine wheel.

10. A combustion chamber as defined in claim 1 wherein said air inlet means is arranged 90° to the plane of the exhaust outlet tube means.

11. A combustion chamber as defined in claim 1 wherein the air nozzle apertures formed in the wall of the body means are arranged in a plurality of concentric circles spaced outwardly from the center line of said fuel nozzle means, each of said apertures is angled slightly with respect to the center line of said fuel nozzle means to provide a swirl configuration to the combustion air to provide complete mixing with the fuel.

12. A combustion chamber as defined in claim 1 wherein said air nozzle apertures formed in the wall of said body means are arranged in a plurality of concentric circles spaced outwardly from the center line of said fuel nozzle means and angled to converge at an apex which corresponds with the center of said spherical body means whereby the air introduced into said combustion chamber thoroughly mixes with fuel introduced by said fuel nozzle means.

13. In a spaced turbine wheel engine, the combination comprising:
a stationary member including an outer casing having a plurality of radially arranged and circumferentially spaced combustion chambers disposed therein about an axis,
said combustion chambers each comprising:
a hollow enclosed generally spherical body means having a center and at least a pair of substantially straight exhaust outlet tube means attached to and extending radially outwardly from opposite side portions of said body means from said center, each exhaust tube means being arranged to conduct the exhaust gases from the combustion chamber, the free end of the tube means having coupling means for attaching the tube means to the outer casing to provide a closed passageway to the tubine wheel, said exhaust outlet tube means being generally in a single plane;
air inlet means connected to said body means, said inlet means being connected to a source of pressurized combustion air for said chamber,
said body means having at least one fuel nozzle mounted through the wall of said body means extending radially inwardly toward said center and connected to a source of pressurized fuel, a plurality of apertures formed through a generally semi-pherically shaped manifold section of the wall of said body means in a substantially uniformly arranged pattern surrounding said fuel nozzle, the outside surface of the body means encompassing the apertures being formed as an enclosed cavity which is connected to said air inlet means whereby combustion air flows continuously through the apertures into the combustion chamber to mix with the fuel being injected into the chamber by the fuel nozzle means;
igniter means mounted through the wall of said body means and connected to a suitable source of energy for igniting the fuel-air mixture in the spherical body means to provide a continuous flow of exhaust gases; and
a rotary member rotatable about the central axis within said outer case, said rotary member including:
a suitably mounted shaft having a hollow air-intake portion with an air-moving impeller thereon and an output portion, said impeller providing the pressurized combustion air which is directed to said combustion chamber air inlet, and
at least two axially spaced turbine wheels mounted for rotation on said shaft disposed within said outer casing, said turbine wheels being arranged to receive said combustion exhaust gas flowing through said exhaust outlet tube means whereby said exhaust gases turn said tubine wheels and rotate said shaft whereby air is first drawn in an axial direction through said hollow air intake shaft portion and then pressurized by said air-moving impeller before being passed into said combustion chambers wherein the mixture of air and fuel is ignited by said igniter means and the exhaust gases are expelled under pressure axially through said exhaust outlet tube means for transferring energy to said turbine wheels for rotating said power output shaft.

14. In a spaced turbine wheel engine as set forth in claim 13 wherein said exhaust outlet tube means includes a pair of tubes extending in opposite angled directions from the associated combustion chamber, each of said exhaust tubes being positioned at an angle of about 45° to the axis of said shaft and disposed at an angle of about 90° to one another.

15. In a spaced turbine wheel engine as set forth in claim 13 including means for directing the air pressurized by the air-moving impeller around the exterior of each combustion chamber and then back in a radial direction to be dispensed through the enclosed cavity and air nozzle apertures provided in the wall of the spherical body means.

16. In a spaced turbine wheel engine as set forth in claim 13 wherein each of said turbine wheels is generally disc-shaped and has a series of spaced turbine blades in its periphery arranged at a selected angle to the plane of the wheel so as to be disposed substantially normal to the passage of exhaust gases through the associated exhaust outlet tube means.

17. In a spaced turbine wheel engine as set forth in claim 13 wherein said turbine blades are turned at an angle of about 55° from the plane of the wheel.

18. In a spaced turbine wheel engine as set forth in claim 13 wherein said turbine blades are of a concavo-convex shape, the concave surface being arranged to face the associated exhaust outlet tube.

19. In a spaced turbine wheel engine as set forth in claim 13 further including an angular exhaust chamber downstream of and in flow communication with each of said turbine wheels, each said exhaust chamber having an exhaust outlet extending radially out therefrom through which the exhaust gases pass.

20. A combustion chamber as defined in claim 1 wherein said body means has a plurality of cooling fins arranged around the outside surface of a wall of said body means to air cool the body and maintain a suitable operation temperature within.

* * * * *